United States Patent [19]

Tolino et al.

[11] Patent Number: 4,696,784

[45] Date of Patent: Sep. 29, 1987

[54] SYSTEM FOR MANIPULATING RADIOACTIVE FUEL RODS WITHIN A NUCLEAR FUEL ASSEMBLY

[75] Inventors: Ralph W. Tolino, Wilkinsburg; William E. King, Plum; Jack L. Blickenderfer, Forest Hills; Charles H. Roth, Jr., North Huntingdon, all of Pa.

[73] Assignee: Westinghouse Electric Corp., Pittsburgh, Pa.

[21] Appl. No.: 594,157

[22] Filed: Mar. 28, 1984

[51] Int. Cl.[4] .............................................. G21C 17/00
[52] U.S. Cl. .................................... 376/245; 376/248; 376/251; 376/260; 376/261
[58] Field of Search ................ 376/245, 248, 251–253, 376/260, 261, 264, 268, 271

[56] References Cited

U.S. PATENT DOCUMENTS

| | | | |
|---|---|---|---|
| 3,169,647 | 2/1965 | Hummel | 376/268 |
| 3,621,580 | 11/1971 | Tovaglieri | 376/245 |
| 3,768,668 | 10/1973 | Schukei | 376/271 |
| 3,914,613 | 10/1975 | Shallenberger et al. | 376/248 |
| 4,032,020 | 6/1977 | Kato et al. | 376/264 |
| 4,175,000 | 11/1979 | Jabsen | 376/251 |
| 4,175,318 | 11/1979 | Matsuura et al. | 29/723 |
| 4,265,010 | 5/1981 | Doss et al. | 376/261 |
| 4,336,103 | 6/1982 | Katscher et al. | 376/245 |
| 4,381,284 | 4/1983 | Gjertsen | 376/364 |
| 4,460,536 | 7/1984 | Krieger | 376/268 |
| 4,464,332 | 8/1984 | Boisseuil et al. | 376/248 |
| 4,482,520 | 11/1984 | Randazza | 376/248 |
| 4,539,174 | 9/1985 | Patenaude | 376/248 |
| 4,575,930 | 3/1986 | Blickenderfer | 376/261 |

FOREIGN PATENT DOCUMENTS

| | | |
|---|---|---|
| 0080418 | 1/1983 | European Pat. Off. . |
| 0095553 | 7/1983 | European Pat. Off. . |
| 0095533A1 | 12/1983 | European Pat. Off. . |
| 1392096 | 2/1965 | France . |
| 298858 | 8/1976 | France . |
| 2525799 | 10/1983 | France . |
| 768456 | 10/1978 | U.S.S.R. . |

Primary Examiner—Salvatore Cangialosi

[57] ABSTRACT

A system constructed of three tools for manipulating fuel rods with a nuclear fuel assembly is disclosed. The individual tools are adapted for displacing fuel rods upwardly and downwardly along their longitudinal axes and for rotating same 360° without having to remove the fuel rods from their location within a nuclear fuel assembly. The individual tools are operative on-site from a remote location while the nuclear fuel assembly is maintained underwater in a spent fuel pool. By manipulating the fuel rods, those areas previously hidden from visual inspection such as within grids may be inspected for defects and the like.

39 Claims, 10 Drawing Figures

SYSTEM FOR MANIPULATING RADIOACTIVE FUEL RODS WITHIN A NUCLEAR FUEL ASSEMBLY

BACKGROUND OF THE INVENTION

The present invention relates in general to a three tool system for manipulsating radioactive fuel rods, and more particularly, to such a system for the extensive on-site remote visual inspection of such radioactive fuel rods which are arranged in an array within a nuclear fuel assembly and located underwater for storage in a spent fuel pool.

In water-cooled nuclear reactors, a plurality of elongated fuel rods and control rod guide thimbles are arranged, as a closely spaced array, in a unified structure known as a nuclear fuel assembly. The fuel rods are generally constructed from elongated cylindrical metal tubes containing nuclear fuel pellets and having both ends sealed by end plugs. These fuel assemblies are arranged in a vertically disposed lattice held together by intermittantly spaced positioning grids to form the reactor core. Typical reactor cores of this type are described and illustrated in U.S. Pat. No. 4,381,284. Although the fuel rods are designed to withstand the effects of the reactor operating environment, including those due to coolant hydraulics, reactor temperature and pressure, fission gas pressure, fuel expansion, and irradiation growth, defects in the fuel rods can often occur which could permit the escape of radioactive fission products.

As part of the continuing process of nuclear fuel development, it is therefore desirable and often necessary to conduct on-site visual examination of spent fuel assemblies for such defects as cracks, reduction of thickness, deformation, impression and corrosion, crud, bows and bulges, and changes in length, so that corrective action, for example, replacement and/or repair of defective or failed fuel rods may be undertaken and design changes may be employed in future fuel rod construction. The spent fuel assemblies are generally maintained underwater at a depth of about 40 to 45 feet, for cooling and shielding purposes, during removal from a reactor core and stored upright in a rack positioned within a spent fuel pool.

One of the many types of examinations required of the fuel assembly is a high magnification visual inspection of the peripheral fuel rods. On one hand, locating and inspecting a fuel rod within a fuel assembly is extremely difficult since such an assembly is radioactive and may contain hundreds of closely spaced fuel rods and guide thimbles. On the other hand, the assemblying and reassemblying of these fuel assemblies is time consuming and may, in itself, result in fuel rod damages. In addition, the area of the fuel rods subject to such damage as fretting is generally hidden by the grid of the fuel assembly. Thsu, only that side of the fuel rod facing the outside of the fuel assembly is accessible for visual inspection.

Thus, it can be appreciated that it is important to have a reliable system for manipulating radioactive fuel rods within a nuclear fuel assembly to permit the high magnification visual inspection of the peripheral fuel rods from a remote location without the need of at least the partial disassemblying of the fuel assembly, as well as permitting the visual inspection of such fuel rods arranged in a closely spaced array for inspecting and locating hidden defects by manipulation of the peripheral fuel rods.

SUMMARY OF THE INVENTION

It is broadly an object of the present invention to provide a system for manipulating radioactive fuel rods within a nuclear fuel assembly which overcomes or avoids the disadvantages resulting from any requirement of at least partially disassemblying the fuel assembly for the inspection of the peripheral fuel rods, and which fulfills the specific requirements of such a system for use in conducting on-site remote high magnification visual inspection of the peripheral fuel rods within a fuel assembly located in an underwater radioactive environment in a spent fuel pool. Specifically, it is within the contemplation of one aspect of the present invention to provide a system for manipulating radioactive fuel rods within a nuclear fuel assembly by rotating the fuel rods about their longitudinal axis, as well as displacing such fuel rods alternatively upward and downward along their longitudinal axis to provide visual inspection of all inaccessible hidden portions, for example, those portions of the fuel rod extending within the grid of the fuel assembly and the inwardly facing portion of the fuel rod.

A further object of the present invention is to proivde a system for manipulating radioactive fuel rods within a nuclear fuel assembly which is operable on-site from a remote location and can be adapted for use with various fuel assembly designs.

A still further object of the present invention is to provide a system for manipulating radioactive fuel rods within a nuclear fuel assembly which permits visual inspection of areas of the fuel rod subject to damage and previously inaccessible to visual inspection.

A yet still further object of the present invention is to provide a system for manipulating radioactive fuel rods within a nuclear fuel assembly which is adapted for measuring the forces required for displacing fuel rods along their longitudinal axis in fuel assemblies designed of non-removable fuel rods.

A yet still further object of the present invention is to provide a system for manipulating radioactive fuel rods within a nuclear fuel assembly which is adapted for use in an underwater environment and which is subjected to nuclear radiation.

A yet still even further object of the present invention is to provide a system for manipulating radioactive fuel rods within a nuclear fuel assembly to provide for the visual inspection of the peripheral fuel rods which does not require at least the partial disassemblying of the fuel assembly for the detection and visual inspection of defects within the fuel rods.

In accordance with one embodiment of the present invention, there is described and illustrated a system for manipulating fuel rods within a fuel assembly for the visual inspection thereof. The system is constructed of displacing means for displacing the fuel rods along their longitudinal axis within a portion of the fuel assembly, and rotating means for rotating the fuel rods within a peripheral portion of the fuel assembly about their longitudinal axis whereby hidden portions of the fuel rods may be visually inspected.

In accordance with another embodiment of the present invention, there is provided a tool for manipulating fuel rods arranged within a fuel assembly for the visual inspection thereof, said tool comprising a fixture attached to said fuel assembly, and manipulating means arranged on said fixture adjacent a portion of said fuel assembly for manipulating said fuel rods to permit their visual inspection while within said fuel assembly.

Further in accordance with the present invention, there is described and illustrated a tool for displacing fuel rods arranged within a fuel assembly constructed of a fixture for supporting the fuel assembly, and displacing means arranged on the fixture adjacent a portion of the fuel assembly for upwardly displacing the fuel rods along their longitudinal axes within a portion of the fuel assembly.

Still further in accordance with the present invention, there is described and illustrated a tool for rotating fuel rods within a fuel assembly constructed of a fixture provided on the fuel assembly, the fixture having a plurality of openings in alignment with the fuel rods arranged about a peripheral portion of the fuel assembly, and rotating means received within one of the openings for rotating the fuel rod in alignment with the one opening about its longitudinal axis upon engagement therewith.

Still even further in accordance with the present invention, there is described and illustrated a tool for displacing fuel rods arranged in a fuel assembly constructed of a fixture provided on the fuel assembly, and displacing means attached to the fixture and arranged adjacent a portion of the fuel assembly for downwardly displacing the fuel rods along their longitudinal axes within the portion of the fuel assembly.

BRIEF DESCRIPTION OF THE DRAWINGS

The above description, as well as further objects, features and advantages of the present invention will be more fully understood by reference to the following detail description of the presently preferred, but nonetheless, illustrative system for manipulating radioactive fuel rods within a nuclear fuel assembly in accordance with the present invention, when taken in conjunction with the accompanying drawings, wherein.

DETAILED DESCRIPTION

Figure 1:
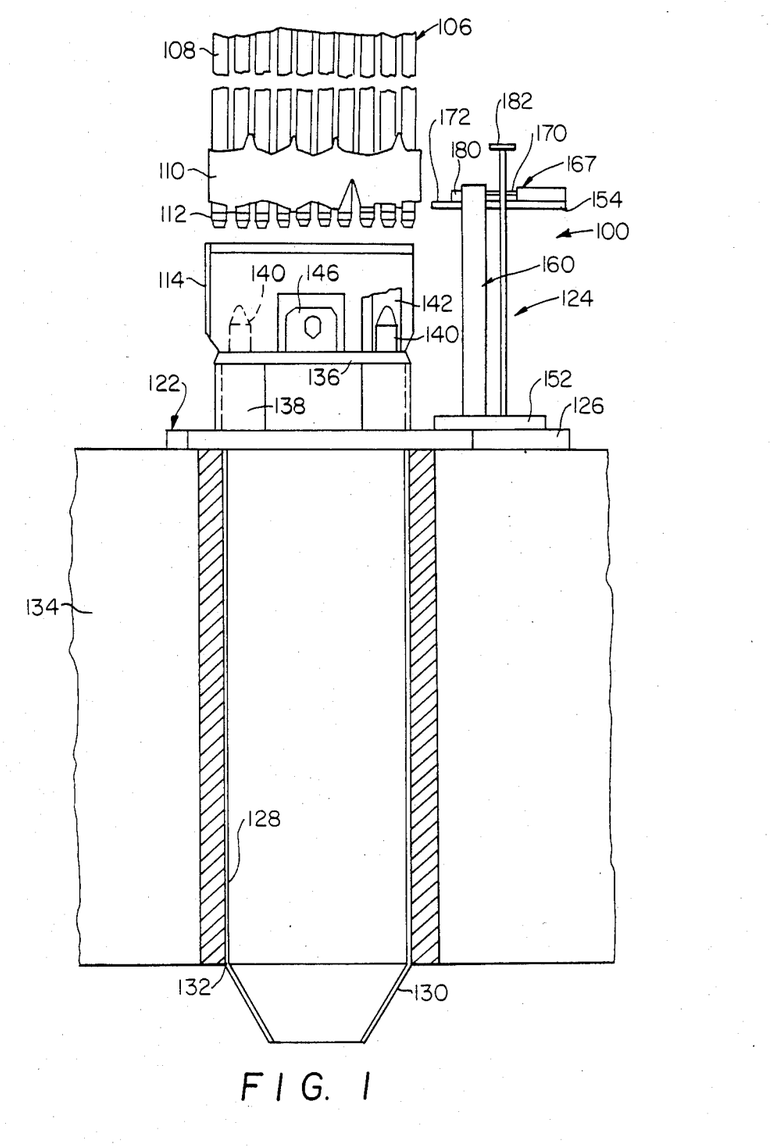
FIG. 1 is a side elevational view showing a nuclear fuel assembly being supported in a vertical orientation by its lower nozzle upon a fixture, which fixture is removably secured within a divided rack located underwater in a spent fuel pool.
Figure 6:
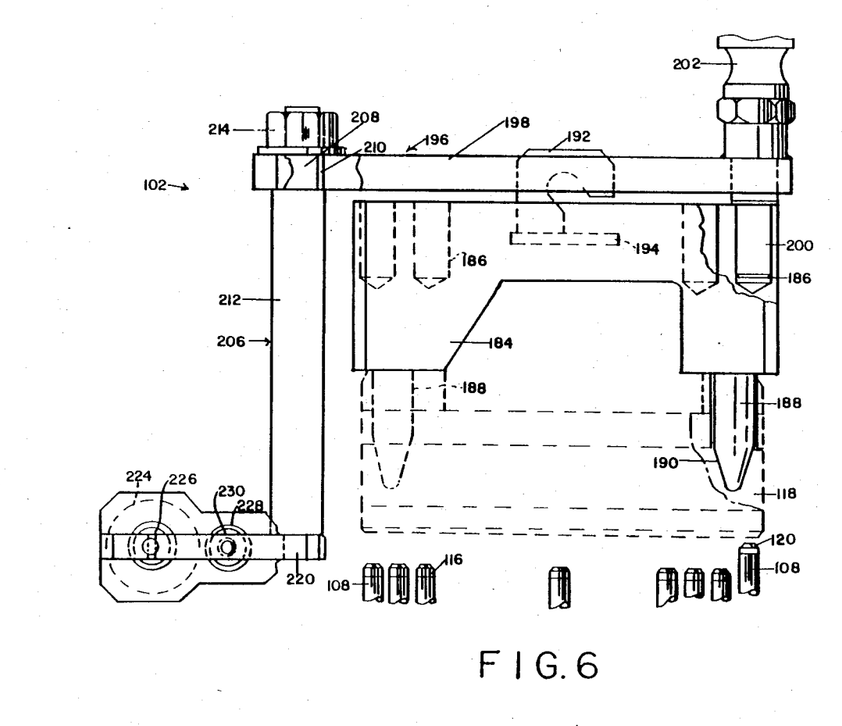
FIG. 6 is a front elevational view of a fuel rod rotating tool supported on an upper nozzle of a fuel assembly and partially constructed of a fixture and a rotating assembly which is partially constructed of a gripping assembly adapted for gripping a peripheral fuel rod and rotating same about its longitudinal axis within the fuel assembly.
Figure 8:
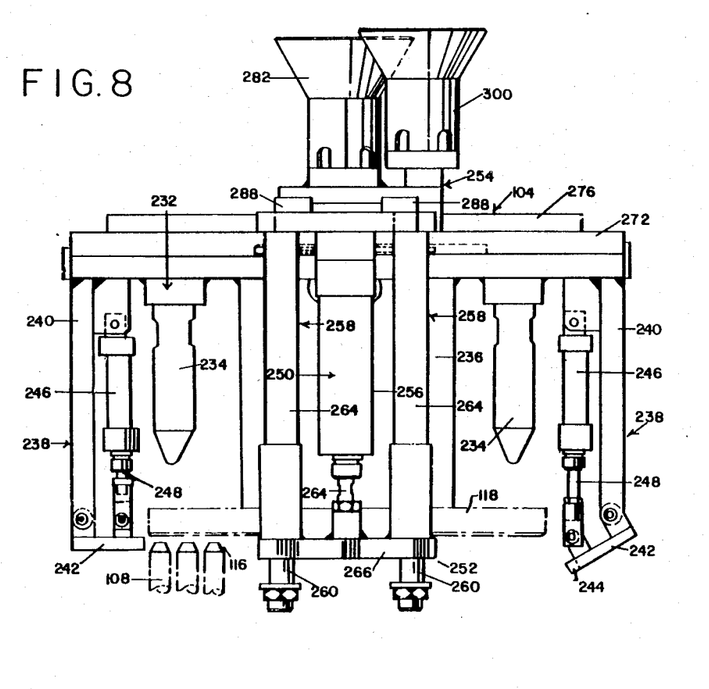
FIG. 8 is a front elevational view of a fuel rod push-down tool removably attached to the upper nozzle of a fuel assembly and partially constructed of a securing assembly adapted for securing the fuel rod push-down tool to the upper nozzle and a push-down assembly reciprocally movable along the direction of the longitudinal axis of the fuel rods.
Figure 9:
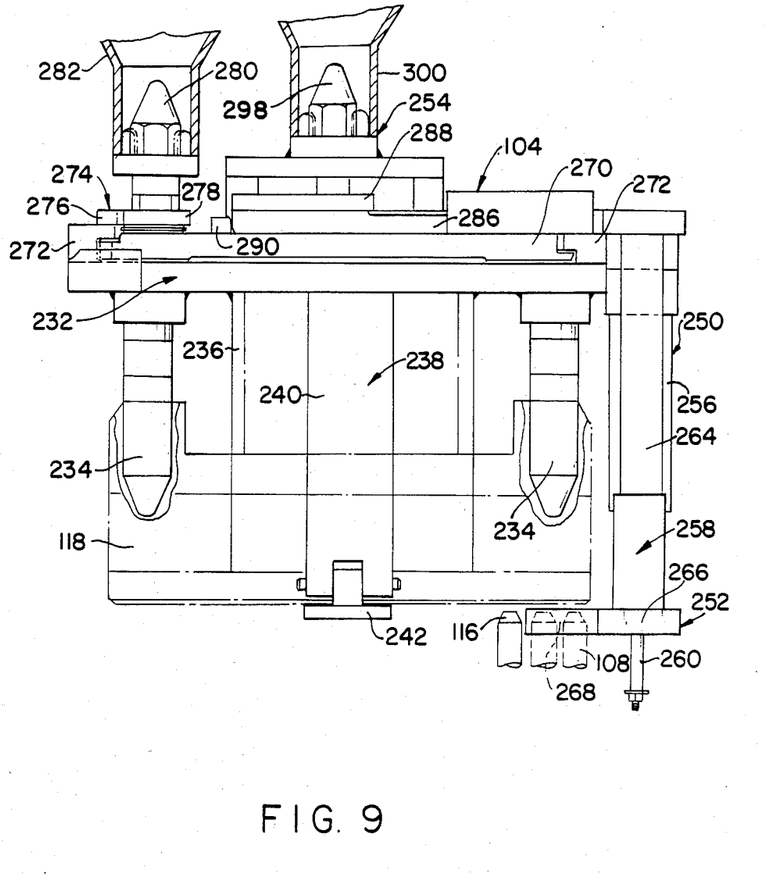
FIG. 9 is a side elevational view of the fuel rod push-down tool as shown in FIG. 8 and partially constructed of an engaging assembly secured to the lower portion of the push-down assembly for engaging the top most portion of a peripheral fuel rod upon movement in a direction transverse to the longitudinal axis thereof.

Referring generally to the drawings in which like reference characters represent like elements, there will now be described the construction and operation of a system for manipulating radioactive fuel rods within a nuclear fuel assembly for their extensive on-site remote visual inspection in accordance with the present invention. The system is generally constructed of a fuel rod lifting tool 100 as to be described with regard to FIGS. 1 through 5, a fuel rod rotating tool 102 as to be described with regard to FIGS. 6 and 7, and a fuel rod push-down tool as to be described with regard to FIGS. 8 through 10. Turning now specifically to FIG. 1, there is shown a portion of a nuclear fuel assembly 106 generally constructed to include a plurality of vertically disposed fuel rods 108 arranged in a closely spaced array. The fuel rods 108 are maintained in their respective position within the array by means of a plurality of grids 110 positioned along the length of the nuclear fuel assembly 106, only one of such grids being shown. Underlying the lower end 112 of the fuel rods 108 is a lower nozzle 114 for the fuel assembly 106. Likewise, as shown in FIGS. 6, 8, and 9, the upper end 116 of the fuel rods 108 are positioned underlying an upper nozzle 118 of the fuel assembly 106.

Briefly, in accordance with the system of the present invention, there is provided a fuel rod lifting tool 100 which provides the capability for lifting peripheral fuel rods 108 so that areas generally hidden by the grids 110 are exposed for close visual inspection, on-site from a remote location. The lifting tool 100 can remotely access any fuel rod 108 on any face of the fuel assembly 106, exerts no lateral forces thereon, and is capable of lifting those fuel rods that have dropped within the fuel assembly 106 and which rest on the lower nozzle 114. The lifting tool 100 can be operated by a long-handed tool (not shown) and by pneumatic pressure. As the individual fuel rods 108 are held in place within the grid 110 by a plurality of retained springs (not shown) the forces required for lifting the individual fuel rods as measured by monitoring the pneumatic pressure during operation of the lifting tool 100 is a clear indication of the grid spring relaxation. This grid spring relaxation is indicative, in part, of the integrity of the fuel assembly 106 and for any requirement for spring replacement and/or repair.

The fuel rod rotating tool 102 provides the capability for viewing the hidden backside of the fuel rods 108 which are arranged around the periphery of fuel assembly 106 within any outside row. The rotating tool 102 is positioned on the upper nozzle 118 of the fuel assembly 106 overlying the fuel rods 108 for engaging their top end plug 120 (see FIG. 6) provided within the upper end 116 of the fuel rods using hydraulic pressure. The engaged peripheral fuel rod 108 can then be rotated up to 360° using a long-handled wrench (not shown) as to be described hereinafter. To utilize the rotating tool 102, it is first required to have the subject fuel rod 108 extending above the other fuel rods so that its top end plug 120 can be engaged. For this purpose, the fuel rod push-down tool 104 is utilized. The fuel rod push-down tool 104 is mounted to the upper nozzle 118 overlying the fuel rods 108 within the fuel assembly 106. A long-handled wrench (not shown) operates the push-down tool 104 so as to push down the peripheral fuel rods in order to access any selected peripheral fuel rod. After pushing down all peripheral fuel rods 108 within the outside two rows of fuel rods within the fuel assembly 106, the subject peripheral fuel rod is lifted using the fuel rod lifting tool 100 to expose its top end plug 120. As with the lifting tool 100, the push-down tool 104 exerts no lateral forces and is capable of pushing down the fuel rods 108 that have been raised to a position against the upper nozzle 118. In addition to lifting or pushing down the outer most row of fuel rods 108 within the fuel assembly 106, the lifting tool 100 will access up to three rows and the push-down tool 104 will access up to two rows into the fuel assembly from the outer most row. By manipulating an internal fuel rod 108, up or down, those areas hidden by the grids 110 can be examined using, for example, a fiberscope.

Referring now to FIGS. 1 through 5, there will be described the construction of the lifting tool 100. The lifting tool 100 is constructed of a fixture 122 for supporting a nuclear fuel assembly 106 thereon and a fuel rod lifting assembly 124 removably arranged on the fixture adjacent a portion of the fuel assembly for upwardly displacing the fuel rods 108 within a peripheral portion of the fuel assembly along their longitudinal axes. The fixture 122, as shown in FIG. 1, is constructed of a generally rectangular planar base 126 having a hollow rectangular guide 128 provided with a tapered end 130 extending normal to the bottom surface of the base. The guide 128 is constructed of suitable dimensions so as to be removably insertable within one of the plural openings 132 provided within the divided racks 134 which are positioned underwater in a spent fuel pool and adapted to each receive a nuclear fuel assembly 106 therein. An elevated support 136 is arranged overlying the upper surface of the base 126 and spaced therefrom in fixed relationship by four angle brackets 138 positioned at the remote corners of the support. The angle brackets 138 are of equal height such that the support 136 lies in a plane parallel to a plane containing the underlying base 126.

Figure 2:
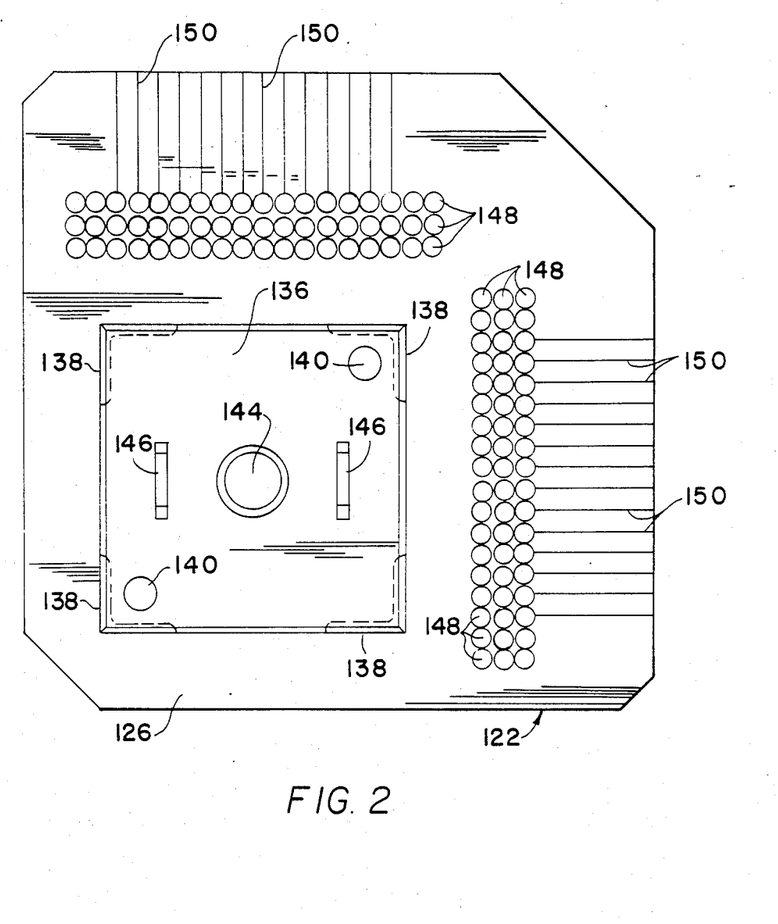
FIG. 2 is a top plan view of the fixture as shown in FIG. 1 showing a plurality of alignment holes arranged in rows and columns along two adjacent sides of the fixture.

Located at opposite corners of the support 136 and extending upwardly therefrom are a pair of tapered guide pins 140. As shown, the guide pins 140 are adapted to be inserted within openings 142 provided within the lower nozzle 114 of the fuel assembly 106 for aligning the fuel assembly atop of the support upon its removal from within one of the underlying plural openings 132 within the divided rack 134. A chamfered opening 144 is centrally located within the support 136 for receiving a positioned tool (not shown) for locating the fixture 122 within one of the plural openings 132 of the divided rack 134, and provided with a crossbar (also not shown) for engaging a pair of spaced apart lifting lugs 146 arranged on opposite sides of the chamfered opening. As best shown in FIG. 2, a plurality of alignment holes 148 are provided within the base 126 arranged in a matrix of three columns and eighteen rows along two adjacent sides of the support 136. The number of rows of alignment holes 148 will vary according to the specific fuel assembly 106 being used. A plurality of indicating grooves 150 are provided within the top surface of the base 126 and extend in parallel alignment along the rows of alignment holes 148 from the outer most column to the peripheral edge of the base and are filled with a brightly colored paint or other such material to provide a visual indicator for the location of each row of alignment holes corresponding to the fuel rods 108 within the fuel assembly 106.

Figure 3:
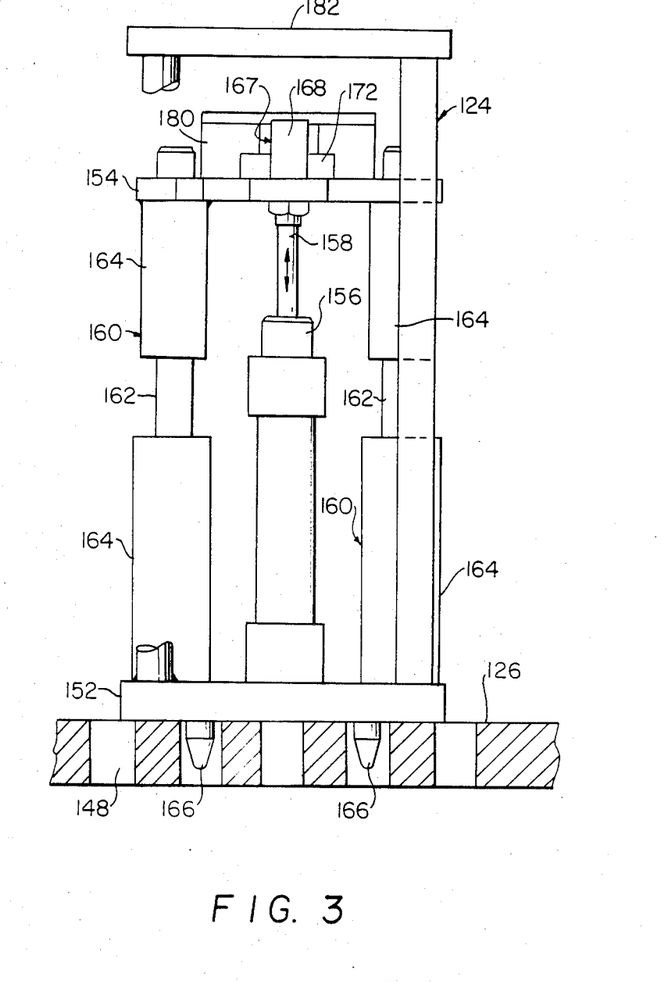
FIG. 3 is a side elevational view of a fuel rod lifting tool supported on the fixture as shown in FIG. 2 and partially constructed of a lifting assembly adapted for reciprocal movement along the direction of the longitudinal axis of the fuel rods within the fuel assembly.
Figures 4, 5:
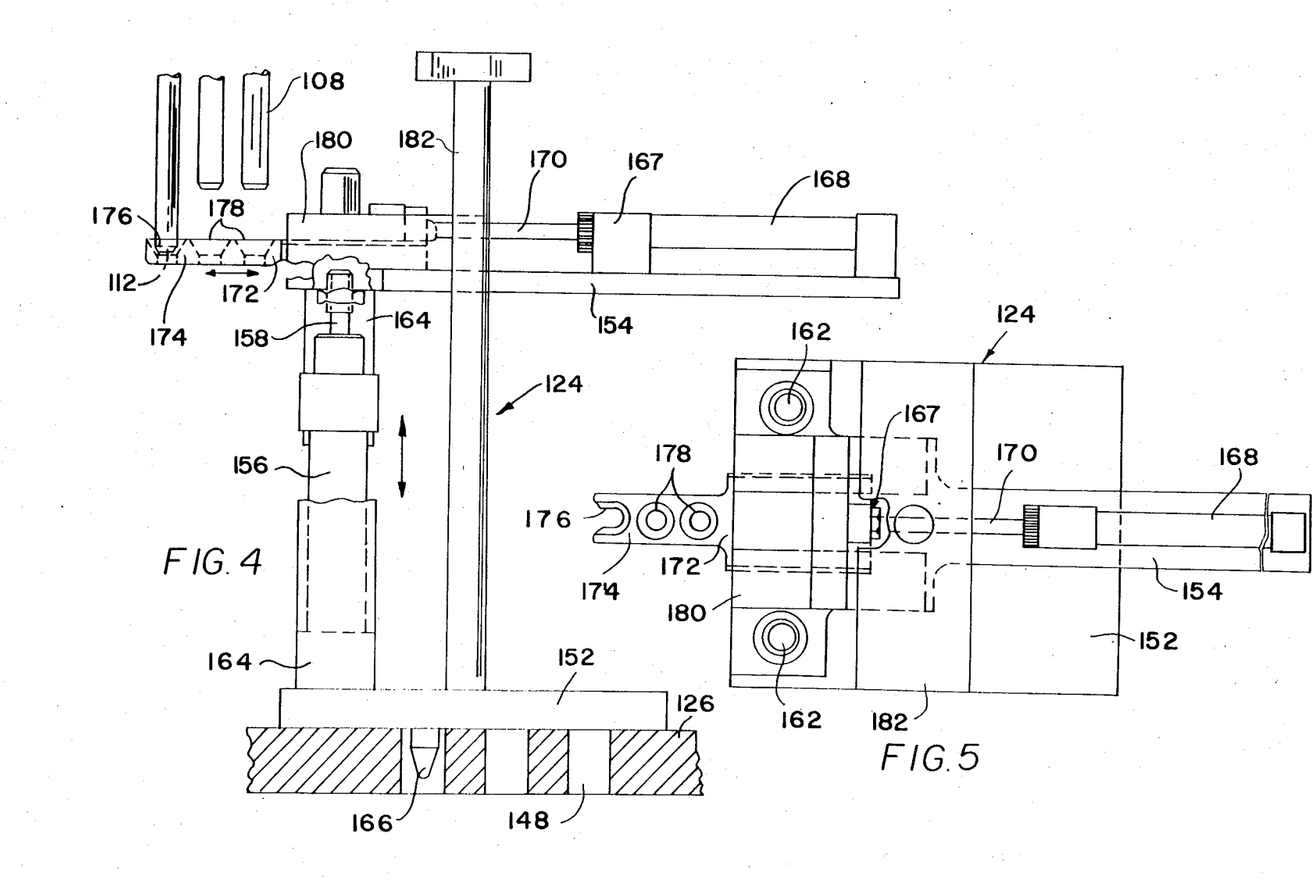
FIG. 4 is a side elevational view of the fuel rod lifting tool as shown in FIG. 3 and further partially constructed of an engaging assembly having a forked end reciprocally movable along a direction transverse to the longitudinal axis of the fuel rods for engagement therewith.
FIG. 5 is a top plan view of the fuel rod lifting assembly as shown in FIG. 4.

Referring now to FIGS. 3 through 5, there follows a detailed description of the fuel rod lifting assembly 124. The lifting assembly 124 is constructed of a base 152 and an overlying spaced apart movable support plate 154. A pneumatic cylinder 156 having a piston rod 158 is attached at a central location between the base 152 and the support 154 to cause vertical reciprocal movement of the support plate upon movement of the piston rod during operation of the pneumatic cylinder. A pair of guide assemblies 160 are attached between the base 152 and support plate 154 on either side of the pneumatic cylinder 156 for maintaining the support plate in a plane parallel to a plane containing the base upon reciprocal movement of the support plate by operation of the pneumatic cylinder 156. Each of the guide assemblies 160 are generally constructed of a support rod 162 slidably received within a pair of opposed tubular support members 164 attached to opposite opposing surfaces of the base 152 and support plate 154. A pair of tapered guide pins 166 are attached to the lower surface of the base 152 and extend transversely therefrom. The guide pins 166 are spaced so as to be insertable within a pair of alignment holes 148 within one column thereof as shown in FIG. 3.

An engaging assembly 167 is constructed of a pneumatic cylinder 168 having a piston rod 170 mounted to the support plate 154 and arranged having its longitudinal axis extending normal to a plane containing the guide assemblies 160 and pneumatic cylinder 156. A forked member 172 having a forked end 174 terminating at a chamfered U-shaped opening 176 is attached to the free-end of the piston rod 170. A pair of chamfered holes 178 are provided within the forked end 174 and are arranged in collinear alignment with the chamfered U-shaped opening 176 for receiving the lower ends of a corresponding plurality of fuel rods 108 arranged in collinear alignment within a peripheral portion of the fuel assembly 106. The reciprocal movement of the forked member 172 is guided by a guide plate 180 secured overlying a portion of the support plate 154 and having an opening therethrough adapted for slidingly receiving the forked member during operation of the pneumatic cylinder 168. A U-shaped lifting assembly 182 is secured to the base 152 straddling the support plate 154 for positioning the fuel rod lifting assembly 124 on the fixture 122 underwater in a spent fuel pool from a remote location.

The operation of the fuel rod lifting tool 100 in accordance with the present invention will now be described with reference to FIGS. 1 through 5. Specifically referring to FIG. 1, a nuclear fuel assembly 106 is removed from one of the plural openings 132 within the divided rack 134 and suspended underwater within the spent fuel pool. A long-handled tool (not shown) is attached to the fixture 122 by means of the lifting lugs 146 for inserting the hollow rectangular guide 128 of the fixture into that opening 132 of the divided rack 134 vacated by the nuclear fuel assembly 106. The nuclear fuel assembly 106 is positioned atop of and in alignment with the elevated support 136 of the fixture 122 by means of the engagement of the guide pins 140 within the openings 142 provided within the opposite corners of the lower nozzle 114 of the nuclear fuel assembly 106. As shown, the fuel rods 108 within the nuclear fuel assembly 106 are arranged having their longitudinal axes extending upwardly within the spent fuel pool in a direction normal to a plane containing the elevated support 136 of the fixture 122. The U-shaped lifting assembly 182 is engaged by bolting a long-handled tool (not shown) for positioning the fuel rod lifting assembly 124 atop of the base 152 of the fixture 122 adjacent one side of the nuclear fuel assembly 106 as best shown in FIG. 1. The fuel rod lifting assembly 124 is aligned with respect to the peripheral fuel rods 108 within the nuclear fuel assembly 106 by means of the insertion of the guide pins 166 within a pair of corresponding spaced apart alignment holes 148 within the base 126 of the fixture 122. The lifting assembly 124 can address any fuel rod 108 within the peripheral portion of the nuclear fuel assembly 106 within the first three rows. The nuclear fuel assembly 106 can be conventionally constructed of a 14×14 array of fuel rods 108, a 15×15 array of fuel rods or a 17×17 array of fuel rods.

The fuel rods lifting assembly 124 is positioned on the base 126 of the fixture 122 such that the U-shaped opening 176 of the forked member 172 is in alignment with the desired fuel rod 108 to be lifted. In order to lift one of the outer most peripheral fuel rods 108 within the nuclear fuel assembly 106, the lifting assembly 124 is supported by the fixture 122 such that the guide pins 166 of the lifting assembly engage a pair of alignment holes 148 provided within the outer most column. Operation of the pneumatic cylinder 168 causes the forked member 172 to travel in a direction transverse to the longitudinal axis of the fuel rod 108 for engaging its lower end 112 by the U-shaped opening 176 of the forked member 172. Activation of the pneumatic cylinder 156 causes the forked assembly 172 to move vertically upward in a manner which displaces the engaged fuel rod 108 upwardly along its longitudinal axis within the nuclear fuel assembly 106. The stroke length of the piston rod 158 determines the extent of upward movement of the fuel rod 108, which in accordance with one example, is approximately one inch. In order to displace the individual fuel rods 108, it is required that a sufficient force be applied by the pneumatic cylinder 156 to overcome the retaining force of the grid springs (not shown) which hold the individual fuel rods within the grids 110 of the nuclear fuel assembly 106. Thus, by measuring the lifting force generated by the pneumatic cylinder 156, a corresponding indication of the grid spring relaxation is provided. Should the grid spring relaxation be greater than acceptable limits, replacement or other corrective action may be undertaken.

With the peripheral fuel rod 108 now displaced upwardly within the nuclear fuel assembly 106, that portion of the fuel rod previously hidden by the grids 110 are exposed for visual inspection using, for example, a fiberscope or other such device having a monitor for visual inspection of the fuel rods on-site from a remote location. Of particular interest is the visual inspection of these hidden areas for fretting damage caused by mechanical wear due to rubbing of the fuel rods 108 against the grid springs during use of the nuclear fuel assembly 106. However, other defects to these hidden areas such as cracks, holes, bulges, and the like may be easily detected upon visual inspection once the fuel rods 108 have been displaced upwardly along their longitudinal axes within the nuclear fuel assembly 106 so as to expose those areas previously hidden by the grids 110. By repositioning the fuel rod lifting assembly 124 in alignment with an adjacent fuel rod 108 within a peripheral portion of the nuclear fuel assembly 106, those fuel rods provided within the outside row of the fuel assembly may be upwardly displaced by the fuel rod lifting assembly 124 for visual inspection. In this manner, the peripheral fuel rods 108 along one side of the fuel assembly 106 may be successively upwardly displaced for visual inspection. The fuel rod lifting assembly 124 can now be positioned along an adjacent side of the nuclear fuel assembly 106 using the second array of alignment holes 148 as shown in FIG. 2 for receiving the guide pins 166 of the lifting assembly. The positioning of the guide pins 166 for alignment with the individual alignment holes 148 is facilitated by the presence of the indicating grooves 150. As thus far described, the fuel rod lifting assembly 124 is adapted for upwardly displacing individual fuel rods within the peripheral portion of two adjacent sides of the nuclear fuel assembly 106. In order to access those fuel rods 108 contained within the remaining two adjacent sides of the fuel assembly 106, it is merely required that the fuel assembly be lifted off of the elevated support 136 and rotated 180° so as to position the remaining two adjacent sides opposite the plurality of alignment holes 148 provided within the fixture 122.

Although the fuel rod lifting tool 100 has been described with respect to the upward displacement of the peripheral fuel rods 108 within the nuclear fuel assembly 106, it is to be understood that the lifting tool can access up to three rows of fuel rods within the peripheral portion of the fuel assembly. Once the outer most peripheral fuel rod 108 has been upwardly displaced by the fuel rod lifting assembly 124, the forked member 172 is retracted by means of the pneumatic cylinder 168 and lowered by means of the pneumatic cylinder 156 for disengagement from the lower end 112 of the fuel rod. The fuel rod lifting assembly 124 can now be repositioned on the base 126 of the fixture 122 by lifting same using the U-shaped lifting assembly 182 and inserting the guide pins 166 into the corresponding alignment holes 148 provided within the next adjacent inner most column. In this manner, the U-shaped opening 176 of the forked end 174 of the forked member 172 will now engage that fuel rod 108 within the second peripheral row of the nuclear fuel assembly 106 to cause its upward displacement upon activation of the pneumatic cylinder 156. Likewise, the fuel rod lifting assembly 124 may be repositioned such that the guide pins 166 are now inserted within the corresponding alignment holes 148 of the inner most column for the upward displacement of those fuel rods 108 within the third peripheral row of the fuel assembly 106 as shown in FIG. 4. That is, after those fuel rods provided in the first and second peripheral rows have been displaced upwardly by the fuel rod lifting assembly 124, the forked end 174 of the forked member 172 can engage the lower end 112 of the fuel rod by operation of the pneumatic cylinder 168. As the fuel rod 108 contained within the third peripheral row of the nuclear fuel assembly 106 is displaced upwardly upon operation of the pneumatic cylinder 156, each lower end 112 of the fuel rods 108 within the first and second peripheral rows of the nuclear fuel assembly 106 are received within the corresponding underlying chamfered holes 178.

As thus far described, the fuel rod lifting tool 100 is generally constructed of a locating fixture 122 used to rigidly position the fuel rod lifting assembly 124 with respect to a series of alignment holes 148. The fuel rod lifting assembly 124 is positioned by inserting the guide pins 166 into the appropriate alignment holes 148. Any fuel rod 108 along the nuclear fuel assembly face and up to three rows deep may be addressed for upward displacment. The lifting operation is accomplished in a series of two steps. First, the pneumatic cylinder 168 is operated to extend the forked end 174 of the forked member 172 underlying the lower end 112 of the selected fuel rod 108. Once in position, the pneumatic cylinder 156 operates to supply the lifting force so as to upwardly displace the fuel rod 108 for examination by exposing those areas hidden by the grids 110. The forked member 172 is then lowered and retracted in a reverse sequence so that the next inward most fuel rod 108 can be selected for upward displacement and vusial inspection.

Figure 7:
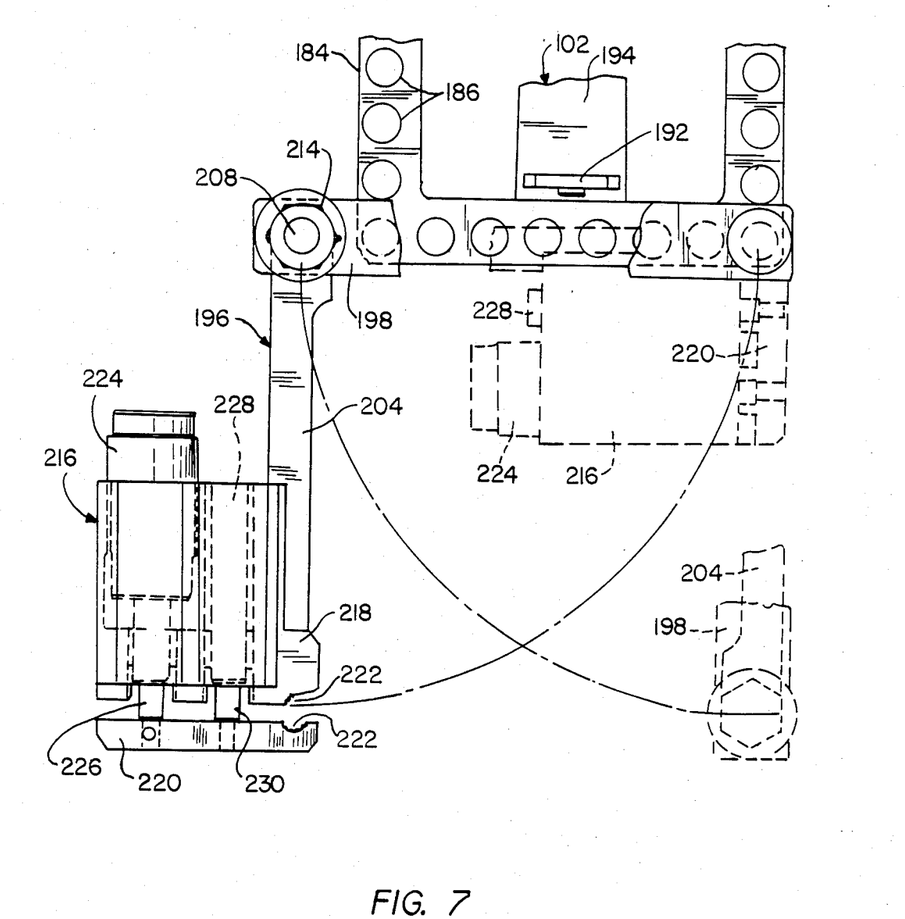
FIG. 7 is a partial top plan view of the fuel rod rotating tool as shown in FIG. 6 showing its operation in rotating a peripheral fuel rod by the structure illustrated in phantom, and showing the gripping assembly partially constructed of a gripper plate and reciprocally movable opposing gripper bar for engaging the top most portion of a fuel rod therebetween.

Referring now to FIGS. 6 and 7, there will be described the construction and operation of the fuel rod rotating tool 102 in accordance with another aspect of the present invention. Specifically, the fuel rod rotating tool 102 is constructed of a hollow rectangular fixture 184 provided with a plurality of locating holes 186 peripherally arranged around the circumference of the fixture. A pair of tapered guide pins 188 project downwardly from opposite corners of the fixture 184 for insertion within a pair of corresponding openings 190 provided within the upper nozzle 118 so as to support the fuel rod rotaing tool 102 overlying the plurality of fuel rods 108 within the underlying nuclear fuel assembly 106. As shown in FIG. 6, a corresponding number of locating holes 186 are provided in alignment with every other underlying fuel rod 108 arranged about the periphery of the fuel assembly 106. As shown, the locating holes 186 correspond to the odd numbered fuel rods 108, therefore necessitating the use of a second fixture 184 having locating holes arranged in alignment with the even numbered underlying fuel rods 108. The requirement for the use of a pair of fixtures 184 having locating holes 186 arranged in alignment with alternatively odd and even numbered underlying fuel rods 108 results from the dimensions of the locating holes being of sufficient magnitude to preclude the use of a single fixture having locating holes corresponding to every-one of the fuel rods within the nuclear fuel assembly 106. The fuel rod rotating tool 102 is positioned overlying the upper nozzle 118 of the nuclear fuel assembly 106 by means of a long-handled tool (not shown) which is adapted for engaging the lifting lugs 192 provided upwardly extending from a cross-brace 194 provided between opposite walls of the fixture 184, in the manner as previously described with respect to the fuel rod lifting assembly 124. Thus, the fuel rod rotating tool 102 may be positioned from a remote location underwater in a spent fuel pool on top of the nuclear fuel assembly 106 such that the guide pins 188 are inserted into the openings 109 within the upper nozzle 118 of the nuclear fuel assembly.

A fuel rod rotating assembly 196 is constructed of a first longitudinal extending member 198 having at one end thereof a downwardly projecting pin 200 and an opposite upwardly projecting connector 202 for attaching to a long-handled wrench (not shown) for controlling the pivotal movement of the first member. The first member 198 is arranged in a horizontal orientation overlying a peripheral portion of one side of the fixture 184 and having the pin 200 inserted within a locating hole 186 overlying the fuel rod 108 to be rotated about its longitudinal axis. A second longitudinally extending member 204 arranged in a horizontal plane is pivotally attached to the free end of the first member 198 by means of a longitudinally extending third member 206 vertically arranged therebetween. The third member 206 if generally constructed of a central rotatable shaft 208, rotatable within a bearing 210, and extending from an outer integral support member 212. The lower end of the shaft 208 is rigidly connected to one end of the second member 204 while the other end thereof extends upwardly through the first member 198 and is secured thereto by a connector 214. The connector 214 is adapted for engagement by a long-handled wrench (not shown) for rotating the second member 204 about the longitudinal axis of the third member 206 underwater in a spent fuel pool from a remote location. As thus far described, the first member 198 is pivotal about the pin 200 within the locating hole 186 in a direction transverse to the longitudinal axis of the fuel rods 108 within the nuclear fuel assembly 106. Likewise, the second member 204 is pivotal about the third member 206 in a direction transverse to the longitudinal axis of the fuel rods 108 and in a plane parallel to a plane containing the first member 198. The rotation of the first and second members 198, 204, as thus far described, is generally shown in phantom in FIG. 7.

A gripping assembly 216 is secured to the free end of the second member 204 and is constructed of a gripper plate 218 and opposed spaced apart gripper bar 220. A pair of toothed notches 222 are provided in opposed relationship at one end of the gripper plate 218 and gripper bar 220. A hydraulic cylinder 224 is mounted to the gripper plate 218 and having a piston rod 226 attached at its free end to the gripper bar 222 to cause reciprocal movement of the gripper bar towards the gripper plate 218 to alter the size of the opening created between the pair of toothed notches 222. A guide assembly 228 is constructed generally similar to the guide assemblies 160 as shown in FIG. 3 and is secured to the gripper plate 218. The guide assembly 228 has a support rod 230 attached at its free end to the gripper bar 220 for maintaining the parallel relationship between the gripper bar and the gripper plate within a common plane during operation of the hydraulic cylinder 224.

The operation of the fuel rod rotating tool 102 for rotating a peripheral fuel rod 108 within the outer most row of the nuclear fuel assembly 106 about its longitudinal axis will now be described. Prior to the use of the fuel rod rotating tool 102, it is generally required that the specific fuel rod 108 to be rotated be lifted vertially upward such that its upper end 116 extends above the upper ends of the remaining adjacent fuel rods. To this end, the fuel rod push-down tool 104 is utilized in a manner to be described hereinafter for pushing down the fuel rods 108 in at least the two outer most peripheral rows as shown in FIG. 6. Once the outer two most rows of fuel rods 108 have been displaced downwardly, the fuel rod lifting tool 100 is used to lift upwardly a selected fuel rod 108 to be rotated by the fuel rod rotating tool 102. As shown in FIG. 6, the right most fuel rod 108 has been displaced upward while the remaining adjacent fuel rods have been displaced downwardly by means of the fuel rod push-down tool 104. The fuel rod push-down tool 104 is replaced by the appropriate fixture 184 of the fuel rod rotating tool 102 so as to rotate either the odd or even numbered fuel rods 108 by supporting the fixture on top of the upper nozzle 118 of the nuclear fuel assembly 106 upon assertion of the guide pins 188 within the openings 190. To this end, the long-handled tool (not shown) is utilized from a remote location for engaging the lifting lugs 192 during the proper placement of the fuel rod rotating tool 102 atop of the nuclear fuel assembly 106. The fuel rod rotating assembly 196 is pivotally mounted to the fixture 184 by inserting the pin 200 within the locating hole 186 arranged overlying the specific fuel rod 108 desired to be rotated, which in FIG. 6 is the right most fuel rod. A long-handled wrench (not shown) is attached to the connector 214 for rotating the gripping assembly 216 with the third member 206 to assume the position as shown in phantom is FIG. 7. In this position, the selected fuel rod 108 is positioned between the toothed notches 222 provided within the gripping assembly 216. Operation of the hydraulic cylinder 224 causes the gripper bar 220 to move toward the gripper plate 218 so as to grip the top end plug 120 of the fuel rod 108. Subsequently, a long-handled wrench (not shown) is attached to the connector 202, and the first and second members 198, 204, as well as the gripping assembly 216, are rotated 90° about the pin 200 while the gripping assembly engages the fuel rod 108 thereby causing its 90° rotation. Repeating this procedure, the selected fuel rod 108 may be rotated through 360° so as to expose all hidden surfaces of the fuel rod for visual inspection by, for example, a fiberscope or TV camera and the like, for detecting various defects. Adjacent odd or even numbered fuel rods 108, depending upon the fixture 184 used, may be rotated in a similar manner upon first lifting the selected fuel rod using the fuel rod lifting tool 100. Where more than one fuel rod 108 has been lifted for rotation, It may be required that the fuel rod lifting tool 102 rotate the selected fuel rods incrementaly in less tha 90° intervals so as to prevent interference between the engaging assembly 216 and adjacent lifted fuel rods within the nuclear fuel assembly 106. If desired, before rotating an adjacent fuel rod 108, the previously rotated fuel rod may be pushed down using the fuel rod push-down tool 104. In this manner, the fuel rods 108 contained within the peripheral outer most row of the nuclear fuel assembly 106 can be rotated about their longitudinal axes for visual on-site inspection from a remote location.

Figure 10:
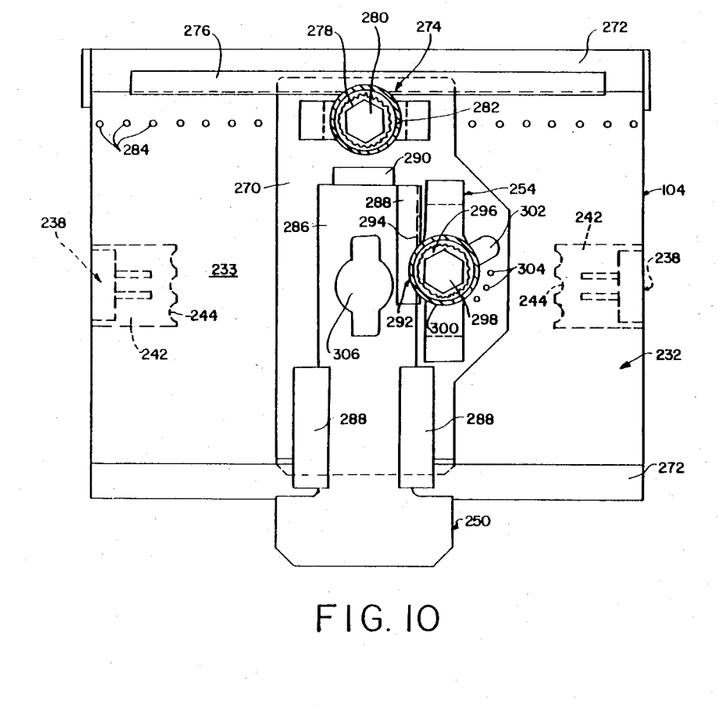
FIG. 10 is a top plan view of the fuel rod push-down tool as shown in FIG. 8 and showing such tool partially constructed of control means for controlling the movement of the engaging assembly along a first direction transverse to the longitudinal axis of the fuel rods within the fuel assembly and for controlling the movement of the push-down assembly along a second direction transverse to the first direction for positioning the engaging assembly along adjacent peripheral portions of the fuel assembly.

There will now be described the construction of the fuel rod push-down tool 104 in accordance with the present invention as illustrated in FIGS. 8 through 10. The fuel rod push-down tool 104 is constructed of a fixture 232 having a generally planar upper surface 233, a pair of tapered guide pins 234 projecting downwardly at opposite corners of the fixture, and a rectangular hollow box 236 centrally located between the guide pins and projecting downwardly therebetween. A securing assembly 238 is attached downwardly extending along opposite sides of the fixture 232. Each of the securing assemblies 238 is of identical construction including a stationary longitudinally downwardly extending member 240 secured to the fixture 232 as best shown in FIG. 8. An arm 242 have a scalloped edge 244 is pivotally connected at one end to the free-ends of the stationary members 240. A pneumatic cylinder 246 is pivotally connected at one end to a portion underlying the fixture 232 adjacent the stationary member 240 and having a piston rod 248 pivotally attached at its free-end to the arm 242 adjacent the scalloped edge 244. A push-down assembly 250 is vertically arranged adjacent one side of the fixture 232 and having its lower end secured to an engaging assembly 252 and its upper end connected to a control assembly 252, which control assembly is arranged overlying the planar surface 233 of the fixture 232.

The push-down assembly 250 is constructed of a pneumatic cylinder 256 centrally disposed between a pair of parallel space guide assemblies 258 as best shown in FIG. 8. The guide assemblies 258 are constructed similar to the guide assemblies 160 as shown in FIG. 3 with respect to the fuel rod lifting tool 100. That is, the guide assemblies 258 are constructed of a longitudinally extending support rod 260 slidingly received within a support member 262. The support members 262 are secured at their opposite ends between the engaging assembly 252 and a projecting portion of the control assembly 254. The pneumatic cylinder 256 is provided with a piston rod 264 having its free end attached to a central portion of the engaging assembly 252. The engaging assembly 252 is constructed of an arm 266 attached to the push-down assembly 250 at the lower ends of the guide assemblies 258 and to the free end of the piston rod 264. The support rods 260 of the guide assemblies 258 extend through an opening provided within the arm 266 permit vertical movement of the arm upon operation of the pneumatic cylinder 256. The free end of the arm 266 is provided with a downwardly facing chamfered U-shaped opening 268 adapted to receive the upper end 116 of a pair of adjacent fuel rods 108 arranged within the outer most and next outer most row of the nuclear fuel assembly 106. In accordance with the construction of the fuel rod push-down tool 104, operation of the pneumatic cylinder 256 causes the reciprocal up-down movement of the arm 266 of the engaging assembly 252 along the longitudinal axis of the support rods 260. In one embodiment, the arm 266 has a total displacement of approximately one inch.

The control assembly 254 is adapted for moving the push-down assembly 250 and engaging assembly 252 along a direction transverse to the longitudinal axis of the fuel rods 108 within the nuclear fuel assembly 106 for engaging the upper end 116 of a selected fuel rod within the peripheral portion of the fuel assembly, and in addition, for controlling such movement along a second direction across the face of the nuclear fuel assembly for aligning the engaging assembly with successive adjacent fuel rods. The control assembly 254 is constructed of a first plate 270 positioned overlying the planar surface 233 of the fixture 232. The opposite ends of the first plate 270 are engaged within longitudinally extended retaining bars 272 to permit movement of the first plate in a plane parallel to the planar surface 233 of the fixture 232. Controlled movement of the first plate 270 is achieved by a rack and pinion assembly 274 constructed of a longitudinally extending toothed rack 276 secured along the inside edge of one of the retaining bars 272. The teeth of the rack 276 are inwardly facing for engaging a pinion gear 278 rotationally mounted to the first plate 270. The pinion gear 278 is secured to a connector 280 which extends upwardly within a cone-shaped housing 282. The housing 282, as a result of its cone shape, facilitates the alignment of a long-handled wrench (not shown) for engagement with the connector 280 when manipulated from a remote location. Rotation of the connector 280 causes rotation of the pinion gear 278 and ultimately via its engagement with the rack 276, causes movement of the first place 270 across the planar surface 233 of the fixture 232. A plurality of indentations 284 are provided within the planar surface 233 of the fixture 232 and are arranged in collinear alignment adjacent the inner edge of one of the retaining bars 272. Each one of the indentations 284 corresponds to the location of an underlying fuel rod 108, such indentations lying along the longitudinal axis of their respective underlying fuel rod. Projecting from the lower surface of the first plate 270 are one or more projections (not shown) arranged for releasably engaging one or more of the indentations 284. For example, the projections may be constructed of spring loaded balls or pins. In this manner, the engagement of a projection with an indentations 284 will momentarily cause the first plate 270 to stop such that the engaging assembly 252 is in alignment with the selected underlying fuel rod 108.

A second plate 286 is movably positioned overlying and secured to the first plate 270 and having one end connected to the push-down assembly 250. The second plate 286 is slidingly retained along its lateral edges by a plurality of retaining bars 288 and a forward stop 290. As the retaining bars 288 are secured to the first plate 270, any movement of the first plate causes movement of the second plate 286 and corresponding movement of the push-down assembly 250. A rack and pinion assembly 292 constructed similar to the rack and pinion assembly 274 as previously described is provided to cause movement of the second plate 286. Briefly, the rack and pinion assembly 292 is constructed of a toothed rack 294 meshed with a pinion gear 296 which is connected to a connector 298 extending upwardly through a cone-shaped housing 300. A tab 302 extending radially outward from the connector 298 is provided with an underlying projection (not shown) for releasably engaging one of a plurality of indentations 304 provided within the upper surface of the first plate 270. Rotation of the connector 298 by means of a long-handled wrench (not shown) causes the movement of the second plate 286 and accordingly the push-down assembly 250 and engaging assembly 252 in a direction transverse to the longitudinal axis of the fuel rods 108 within the nuclear fuel assembly 106. The indentations 304 correspond to the inner location of the fuel rods 108 within the nuclear fuel assembly 106 in a similar manner as the indentations 284 provided within the planar surface 233 of the fixture 232. Centrally located within the second plate 286 is a key-hole shaped opening 306 adapted for releasably engaging a long-handled lifting tool (not shown) for positioning the fuel rod push-down tool 104 on top of a nuclear fuel assembly 106.

The operation of the fuel rod push-down tool 104 for the downwardly displacing peripheral fuel rod 108 within the nuclear fuel assembly 106 will now be described. As previously described, the fuel rod push-down tool 104 is adapted for downwardly displacing the fuel rods 108 within a peripheral portion of the nuclear fuel assembly 106 prior to using the fuel rod rotating tool 102. In addition, the fuel rod push-down tool 104 permits visual inspection of that portion of the fuel rod 108 hidden by the lower portions of the grids 110 of the nuclear fuel assembly 106. Thus, the use of the fuel rod lifting tool 100 in combination with the fuel rod push-down tool 104 permits complete inspection of that portion of the fuel rods 108 hidden by the grids 110 of the nuclear fuel assembly 106. The fixture 232 is positioned overyling the upper nozzle 118 of the nuclear fuel assembly 106 and is supported thereon by the centrally located box 236 and the insertion of the guide pins 34 within openings 190 provided within the upper nozzle 118 in a similar manner with regard to the fuel rod rotating tool 102. The fuel rod push-down tool 104 is secured to the top nozzle 118 of the nuclear fuel assembly 106 by operation of the pneumatic cylinders 246. Initially, the pneumatic cylinders 246 have the piston rods 248 extended as shown in the right hand portion of FIG. 8 such that the arms 242 as pivotally secured to the stationary members 240 are arranged in an open position. Upon operation of the pneumatic cylinders 246, the piston rods 248 are retracted to cause pivotal movement of the arms 242 into a closed position as shown in the left hand portion of FIG. 8. In the closed position, the arms 242 engage under the lower edge of the upper nozzle 118 of the nuclear fuel assembly 106 so as to secure the fixture 232 thereon. The scalloped edges 244 of the arms 242 prevent engagement of the leading edge of the arms 242 with the peripheral row of fuel rods 108.

A selected peripheral rod 108 within the nuclear fuel assembly 106 is addressed by positioning the push-down assembly 250 such that the engaging assembly 252 is in alignment therewith. Movement of the push-down assembly 250 is achieved using the rack and pinion assembly 274 coupled to the first plate 270. The U-shaped opening 268 of the arm 266 can be positioned opposite any selected fuel rod 108 within the peripheral portion of the nuclear fuel assembly 106 along any face thereof. The positioning of the push-down assembly 250 with respect to a selected fuel rod 108 is facilitated by means of the indentations 284 upon engagement with the projection (not shown) provided on the first plate 270 as previously described. Operation of the rack and pinion assembly 292 causes inward movement of the engaging assembly 252 such that the upper end 116 of the outer most peripheral fuel rod 108 is engaged therewith.

As shown in FIG. 9, the engaging assembly 252 has been moved inwardly in a direction transverse to the longitudinal axis of the fuel rods 108 so as to engage the fuel rods 108 within the two outer most peripheral rows of the nuclear fuel assembly 106. The engaged fuel rods 108 are displaced downwardly along their longitudinal axis by operation of the pneumatic cylinder 256. Thus, fuel rods 108 within a peripheral portion of the nuclear fuel assembly 106 may be engaged by the engaging assembly 252 and displaced downward along their longitudinal axes by means of the push-down assembly 250 as desired. The push-down assembly 250 can be moved back-and-forth across the face of the nuclear fuel assembly 106 and in-and-out of the assembly by use of a long-handled wrench (not shown) which connects to the connectors 280, 298 for operation of the rack and pinion assemblies 274, 292. To gain access to those fuel rods 108 on adjacent faces of the nuclear fuel assembly 106, the fuel rod push-down tool 104 is removed, rotated 90°, and repositioned on top of the upper nozzle 118 of the nuclear fuel assembly. The use of the indentation 284, 304, as previously described, facilitates the location and alignment of the engaging assembly 252 with one or more selected fuel rods 108.

There has thus far been described a system constructed of three tools for manipulating individual fuel rods within a nuclear fuel assembly. The tools are adapted for displacing the fuel rods along their longitudinal axes in an upward and downward direction as well as rotating the fuel rods 360° about their longitudinal axes. The present invention has specific application in nuclear fuel assemblies having permanently installed fuel rods that cannot be removed for routine visual examination for detection of various defects. The system of the present invention is particularly adaptable for manipulating the fuel rods from an on-side remote location while the fuel rods are located underwater in a spent fuel pool. Although the invention herein has been described with reference to particular embodiments, it is to be understood that these embodiments are merely illustrative of the principles and application of the present invention. It is therefore to be understood that numerous modifications may be made in the illustrative embodiments and that other arrangements may be devised without departing from the spirit and scope of the present invention as defined by the appended claims.

What is claimed is:

1. A tool for manipulating the peripherally located fuel rods of a fuel assembly so that said rods can be visually inspected, wherein said fuel assembly includes top and bottom nozzles, each of which is connected to a support skeleton, as well as a plurality of grids, and wherein said rods are retained within said grids and confined between the top and bottom nozzles thereof, comprising:
    (a) a fixture that is detachably connectable to one of said nozzles of the fuel assembly, said fixture having a plurality of holes therein;
    (b) rotating means pivotally mountable within said holes of said fixture for selectively gripping and rotating said rod, and
    (c) a displacing means mounted on said fixture for reciprocably displacing said rods within said fuel assembly, including a lifting assembly and a push-down assembly for lifting and pushing down a selected one of said rods, respectively,
    whereby said rods can be selectively rotated, lifted, and pushed down in order to expose portions of said rods which are normally hidden to visual inspection while said nozzles stay connected to said support skeleton and said rods stay confined between the top and bottom nozzles of said fuel assembly.

2. The tool defined in claim 1, wherein said gripping means of said rotating means grips and rotates the top end of a selected fuel rod, and wherein the push-down assembly and lifting assembly cooperate to displace the top end of said selected fuel rod above the top ends of adjacent fuel rods to provide access for said gripping means of said rotating means within the fuel assembly.

3. The tool defined in claim 2, wherein the lifting assembly includes a forked member movable transversely with respect to said fuel for engaging and lifting the bottom end of a selected one of said rods, and wherein said forked member includes a plurality of rod-receiving apertures alignable with the bottom ends of a column of fuel rods so that said forked member may engage and lift the fuel rods that are behind the outermost fuel rods of the fuel rod assembly.

4. The tool defined in claim 1, wherein said lifting assembly includes means for monitoring the force necessary to lift a selected rod within the confines of the fuel assembly in order to determine the retention force of the grids of the fuel assembly.

5. A tool for manipulating the first two rows of fuel rods on all sides of an assembled fuel assembly so that the rods can be visually inspected for defects, wherein said fuel assembly includes top and bottom nozzles, each of which is connected to a support skeleton, as well as a plurality of grids, and wherein said rods are retained within the grids of the fuel assembly and confined between the top and bottom nozzles thereof, comprising
    (a) a fixture detachably mountable on the top nozzle of the fuel assembly having a plurality of index holes therein;
    (b) rotating means pivotally mountable within said index holes of said fixture for selectively gripping and rotating a fuel rod, and
    (c) a displacing means mounted on said fixture for reciprocably displacing said rods within said fuel assembly, including a lifting assembly for displacing the top end of a selected fuel rod above the top ends of adjacent fuel rods to provide access for the gripping means of the rotating means within the fuel assembly, wherein the lifting assembly includes a forked member movable transversely with respect to the fuel assembly for engaging and lifting the bottom end of a selected one of said rods, said fork member including a plurality of rod-receiving apertures alignable with the bottom ends of a column of fuel rods so that said forked member may engage and lift the fuel rods that are behind the outermost fuel rods of the fuel assembly, and wherein the lifting assembly further includes a force monitoring means for monitoring the retention force of the grids of the fuel assembly on said selected fuel rod, and a push-down assembly for pushing the top of said selected rod down level with the top ends of adjacent fuel rods after said inspection has been completed,
    whereby said rods can be selectively rotated, lifted, and pushed down in order to expose portions of said rods which are normally circumscribed by the grids and hidden to visual inspection while said nozzles stay connected to said support skeleton and the rods stay confined between the top and bottom nozzles of the fuel assembly.

6. A tool for manipulating fuel rods within an assembled fuel assembly for the visual inspection thereof, said fuel assembly including top and bottom nozzles, each of which is connected to a support skeleton, as well as a plurality of grids, and wherein said fuel rods are retained within said grids and confined between said nozzles; said tool comprising: a fixture attached to one of said nozzles of the fuel assembly, manipulating means for lifting and lowering said rods within said assembled fuel assembly, and a rotating means arranged on said fixture adjacent a portion of said fuel assembly for rotating said fuel rods about their longitudinal axes upon engagement therewith to permit the visual inspection of portions of said rods normally hidden while said nozzles stay connected to said support skeleton and said rods remain confined within said assembled fuel assembly.

7. The tool of claim 6 wherein said fixture includes a plurality of holes in alignment wih said fuel rods arranged about a peripheral portion of said fuel assembly, and wherein said plurality of holes are arranged overlying every other one of said fuel rods about said peripheral portion of said fuel assembly.

8. The tool of claim 6 wherein said fixture includes guiding means for engaging a top portion of said fuel assembly whereby said fixture is removably supported atop of said fuel assembly such that said plurality of holes are arranged in alignment with said underlying fuel rods.

9. The tool of claim 6 wherein said rotating means comprises a rotating assembly including a first and second member rotatably coupled to each other at one end thereof, the other end of said first member pivotally received within a hole within said fixture, and the other end of said second member having gripping means for gripping said fuel rod underlying said hole.

10. The tool of claim 9 wherein said first and second members are arranged for movement in a direction transverse to the longitudinal axis of said fuel rod within said hole.

11. The tool of claim 9 wherein said first member is disposed in a first horizontal plane and said second member is disposed in a second horizontal plane.

12. The tool of claim 11 wherein said first and second members are spaced apart in said first and second horizontal planes by a third member vertically arranged therebetween, said third member attached between said first and second member at said one ends thereof.

13. The tool fo claim 9 wherein said gripping means comprises a gripper bar and gripper plate, said gripper bar movable between a first and second position opposing said gripper plate for gripping said fuel rod therebetween when in said first position and releasing said fuel rod when in said second position.

14. The tool of claim 13 wherein said gripping means includes moving means for moving said gripper bar between said first and second positions.

15. The tool of claim 9 wherein said second member is rotatable about said one end coupled to said first member for engaging said fuel rod by said gripping means and said first member is rotatable about said hole whereby said fuel rod is rotatable about its longitudinal axis when engaged by said gripping means.

16. The tool of claim 9, further including first control means for rotating said first member about said one hole and second control means for rotating said second member about said one end rotatably coupled to said first member.

17. The tool of claim 16 wherein said first and second control means are operable from a remote location.

18. The tool of claim 13 wherein said manipulating means comprises displacing means attached to said fixture and arranged adjacent a portion of said fuel assembly for downwardly displacing said fuel rods along their longitudinal axes within said portion of said fuel assembly.

19. The tool of claim 18 wherein said fixture includes securing means for releasably securing said fixture to said fuel assmebly.

20. The tool of claim 19 wherein said securing means comprises an arm movable between an open and closed position whereby said arm engages a portion of said fuel assembly for securing said fixture thereto when in said closed position and allowing removal of said fixture from said fuel assembly when in said open position.

21. The tool of claim 19 wherein said fixture includes guiding means for aligning said fixture atop of said fuel assembly.

22. The tool of claim 18 wherein said displacing means comprises engaging means for engaging at least one of said fuel rods within said fuel assembly and push-down means for pushing down said fuel rod engaged by said engaging means.

23. The tool of claim 22 wherein said engaging means comprises an engaging assembly movable between a first and second position along a first direction transverse to the longitudinal axes of said fuel rods within said fuel assembly, said assembly engaging the upper end of at least one of said fuel rods when in said first position and disengaging from said upper end of said fuel rod when in said second position.

24. The tool of claim 23 further including control means for controlling the movement of said engaging means between said first and second positions along said first direction.

25. The tool of claim 24 wherein said control means includes means for operating said control means from a remote location.

26. The tool of claim 23 further including control means for controlling the movement of said push-down means along a second direction transverse to said first direction for positioning of said engaging means along adjacent portions of said fuel assembly.

27. The tool of claim 26 wherein said control means includes means for operating said control means from a remote location.

28. The tool of claim 22 wherein said push-down means comprises a push-down assembly reciprocally movable along the direction of the longitudinal axes of said fuel rods for displacing one of said fuel rods engaged by said engaging means downwardly within said fuel assembly along its longitudinal axis.

29. A system for manipulating fuel rods within an assembled fuel rod assembly for the visual inspection thereof, said fuel assembly including top and bottom nozzles, each of which is connected to a support skeleton, as well as a plurality of grids, and wherein said fuel rods are retained within said grids and confined between said nozzles, said system comprising a fixture detachably mountable onto one of said nozzles, displacing means mountable onto said fixture including a fuel rod lifting assembly and a fuel rod push-down assembly for displacing said fuel rods along their longitudinal axes within a portion of said fuel assembly, and rotating means pivotally mountable on said fixture for gripping the top ends of these rods and rotating said fuel rods about their longitudinal axes whereby portions of said fuel rods normally hidden may be visually inspected, wherein said displacing means and said rotating means are operable while said nozzles stay connected to said support skeleton and while said rods remain confined within said fuel assembly.

30. The system of claim 29 wherein said rotating means includes a gripping means for gripping and rotating the top end of a selected fuel rod, and wherein said push-down assembly and said lifting assembly cooperate to dispose the top end of said selected fuel rod above the top ends of adjacent fuel rods and to lower the top end of said selected fuel rod level with the top ends of said adjacent fuel rods after said visual inspection is made.

31. The system of claim 30 wherein said fixture includes a plurality of rows and columns adjacent two sides of said fixture for aligning said displacing means with said fuel rods within said fuel assembly.

32. The system of claim 31 wherein said displacing means includes guiding means for inserting into at least a pair of said alignment holes within a common column whereby said displacing means is removably supported upon said fixture at a location spaced from said fuel rods along one face of said fuel assembly.

33. The system of claim 29 wherein said fuel rod lifting assembly includes engaging means for engaging at least one of said fuel rods within said fuel assembly by lifting means for lifting said fuel rod engaged by said engaging means.

34. The system of claim 33 wherein said engaging means comprises an engaging assembly movable between a first and second position in a direction transverse to the longitudinal axes of said fuel rods within said fuel assembly, said assembly engaging the lower end of one of said fuel rods within said fuel assembly when in said first position and disengaging from said lower end of said fuel rod when in said second position.

35. The system of claim 33 wherein said lifting means comprises a lifting assembly reciprocally movable along the direction of the longitudinal axes of said fuel rods within said fuel assembly for displacing said fuel rods engaged by said engaging means upwardly within said fuel assembly along their longitudinal axes.

36. The system of claim 31 wherein said fixture includes a plurality of holes in alignment with said fuel rods arranged about a peripheral portion of said fuel assembly, and said rotating means is received within one of said holes for rotating said fuel rod in alignment with said one hole about its longitudinal axis upon engagement therewith.

37. The system of claim 36 wherein said rotating means comprises a rotating assembly including a first and second member rotatably coupled to each other at one end thereof, the other end of said first member pivotally received within a hole within said fixture, and the other end of said second member having said gripping means for gripping said fuel rod underlying said hole.

38. The system of claim 37 wherein said first and second members are spaced apart in first and second horizontal planes by a third member vertically arranged therebetween, said third member attached between said first and second member at said one ends thereof.

39. The system of claim 37 wherein said gripping means comprises a gripper bar and gripper plate, said gripper bar movable between a first and second position opposing said gripper plate for gripping said fuel rod therebtween when in said first position and releasing said fuel rod when in said second position.

* * * * *